US007500149B2

(12) United States Patent
Grieskamp et al.

(10) Patent No.: US 7,500,149 B2
(45) Date of Patent: Mar. 3, 2009

(54) GENERATING FINITE STATE MACHINES FOR SOFTWARE SYSTEMS WITH ASYNCHRONOUS CALLBACKS

(75) Inventors: Wolfgang Grieskamp, Redmond, WA (US); Colin L. Campbell, Seattle, WA (US); Lev Borisovich Nachmanson, Redmond, WA (US); Margus Veanes, Bellevue, WA (US); Michael Barnett, Seattle, WA (US); Nikolai Tillmann, Redmond, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 553 days.

(21) Appl. No.: 11/097,684

(22) Filed: Mar. 31, 2005

(65) Prior Publication Data

US 2006/0224924 A1 Oct. 5, 2006

(51) Int. Cl.
*G06F 11/00* (2006.01)
(52) U.S. Cl. .......................................... 714/38; 717/104
(58) Field of Classification Search .................. 714/38; 717/104, 105, 126; 703/22
See application file for complete search history.

(56) References Cited

U.S. PATENT DOCUMENTS

| 5,389,838 | A | * | 2/1995 | Orengo ........................ 326/93 |
| 5,913,061 | A | * | 6/1999 | Gupta et al. ................ 719/310 |
| 6,038,378 | A | * | 3/2000 | Kita et al. .................... 714/38 |
| 6,973,638 | B1 | * | 12/2005 | Gangopadhyay et al. .... 717/104 |
| 6,993,706 | B2 | * | 1/2006 | Cook .......................... 719/315 |
| 7,076,417 | B2 | * | 7/2006 | Jain et al. .................... 703/20 |
| 2003/0121027 | A1 | | 6/2003 | Hines |
| 2003/0159087 | A1 | | 8/2003 | Grieskamp et al. |

OTHER PUBLICATIONS

Bekkerman, P. "FSMGenerator Finite State Machine generating software." copyright 2002-2003. retrieved from "http://fsmgenerator.sourceforge.net/" on Feb. 28, 2008.*
U.S. Appl. No. 10/758,797, filed Jan. 15, 2004, Nachmanson et al.
Barnett et al., *Towards a Tool Environment for Model-Based Testing with AsmL*, In 3rd International Workshop on Formal Approaches to Testing of Software (FATES 2003), Oct. 2003, 9 pages.
Barnett et al., "The Spec# Programming System: An Overview," CASSIS 2004, LNCD 3362, pp. 49-69, 2005.

(Continued)

*Primary Examiner*—Robert Beausoliel
*Assistant Examiner*—Philip Guyton
(74) *Attorney, Agent, or Firm*—Klarquist Sparkman, LLP

(57) ABSTRACT

Techniques and tools for generating finite state machines ("FSMs") for a software system with asynchronous callbacks are described. For example, method invocations in a model of the software system are partitioned into observable and controlled method invocations. The controlled method invocations are those which can be run from a test harness while the observed method invocations are those which are observed asynchronously as they are invoked in the system. An FSM is created with observation and control nodes such that observable transitions are found from observation nodes and controlled transitions are found from control nodes. If a state of the model contains both controlled and observable invocations, a timeout transition is added to the FSM to give an implementation time to come up with an observed method invocation before continuing to controlled invocations.

31 Claims, 6 Drawing Sheets

OTHER PUBLICATIONS

Blass et al., "Play to test," Technical Report MSR-TR-2005-04, Microsoft Research, 15 pages, Jan. 2005.

Cacciari et al., "Controllability and observability in distributed testing," *Information and Software Technology*, 41, pp. 767-780, 1999.

Campbell, et al., "Multiplexing of Partially Ordered Events," TestCom 2005, LNCS 3502, pp. 97-110, 2005.

De Alfaro, "Game Models for Open Systems," *Verification: Theory and Practice: Essays Dedicated to Zohar Manna on the Occasion of His 64th Birthday*, vol. 2772 of LNCS, pp. 269-289, 2004.

De Alfaro et al, "Interface Automata," *Proceedings of the 8th European Software Engineering Conference held jointly with 9th ACM SIGSOFT International Symposium on Foundations of Software Engineering*, vol. 26(5) of *ACM SIGSOFT Software Engineering Notes*, ACM Press, pp. 109-120, 2001.

Grieskamp et al., "Instrumenting scenarios in a model-driven development environment," *Information and Software Technology*, 46(15), pp. 1027-1036, Dec. 2004.

Gurevich et al., "Semantic Essence of AsmL: Extended Abstract," *Formal Methods for Components and Objects, Second International Symposium, FMCO 2003*, vol. 3188 of LNCS, pp. 240-259, 2004.

Hallal et al., "Antipattern-based Detection of Deficiencies in Java Multithreaded Software," *Proceedings of the Fourth International Conference on Quality Software (QSIC2004)*, 10 pages, 2004.

Hallal et al., "An Automata-based Approach to Property Testing in Event Traces," *Proceedings of the IFIP TC6/WG6.1 XV International Conference on Testing of Communicating Systems (TestCom 2003)*, vol. 2644 of LNCS, pp. 180-196, 2003.

Hoare, "An Axiomatic Basis for Computer Programming," Communications of the ACM, vol. 12, No. 10, 1969, pp. 576-583.

Huo et al., "On Testing Partially Specified IOTS through Lossless Queues," *Proceedings of the 16th IFIP International Conference, TestCOM 2004*, vol. 2978 of LNCS, pp. 76-94, 2004.

King, "Symbolic Execution and Program Testing," Communications of the ACM, vol. 19, No. 7, 1976, pp. 385-394.

Lamport, "Time, Clocks, and the Ordering of Events in a Distributed System," Communications of the ACM, vol. 21, No. 7, pp. 558-565, Jul. 1978.

Petrenko et al., "Testing Transition Systems with Input and Output Testers," TestCom 2003, pp. 129-145.

Tasiran et al., "Runtime Refinement Checking of Concurrent Data Structures," *Electronic Notes in Theoretical Computer Science, Proceedings of the Fourth Workshop on Runtime Verification*, 113:163-179, 2004.

Tretmans et al., "TorX: Automated Model-Based Testing," Editors: A. Hartman and K. Dussa-Ziegler, First European Conference on Model-Driven Software Engineering, Nuremberg, 2003, 13 pages.

Veanes et al., "On-The-Fly Testing of Reactive Systems," Technical Report MSR-TR-2005-05, Microsoft Research, 16 pages, Jan. 2005.

Visser et al. "Test Input Generation with Java PathFinder," ISSTA '04, Jul. 11-14, 2004, Boston, Massachusetts, pp. 97-107.

Fidge, "Partial Orders for Parallel Debugging," 1988, ACM, pp. 183-194.

Henninger et al., "Automatic Generation of Test Purposes for Testing Distributed Systems," Feb. 2004, SpringerLink, pp. 178-191.

Krasucki et al., "Knowledge and the Ordering of Events in Distributed Systems Extended Abstract," 1994, ACM, pp. 267-283.

\* cited by examiner

GENERATING FINITE STATE MACHINES FOR SOFTWARE SYSTEMS WITH ASYNCHRONOUS CALLBACKS

TECHNICAL FIELD

The present application relates generally to the testing of asynchronous callback behavior in software systems.

BACKGROUND

An important part of the development of software systems is testing. Because software systems can involve millions of lines of source code in separate modules or routines which must interact, testing is necessary before a system can be shipped, so as to confirm that a given system performs as expected under various configurations and with various inputs. Oftentimes, extensive testing at different development levels, and under a wide variety of testing conditions, helps developers feel confident that the system is unlikely to exhibit unexpected behavior when used by consumers.

Different types of software system testing are used at different stages in development. For example, source code is tested at compile time for syntactic and logical errors before being compiled into executable code. Or, system implementations, either in part or in whole, are tested by users manually affecting inputs and configurations of the system to test against expected outputs. In yet other examples, this testing is automated, using a separate software module or application to automatically run software through batteries of tests.

Software testing is often performed with reference to a specification of behaviors for the software system being tested. This is done, for example, when the software development process involves development of a behavioral specification before a system implementation is created by writing code. By testing the implementation against the behavioral specification, errors which have been introduced during the coding process can be identified and corrected.

The behavioral specification that underlies testing may include static and/or dynamic aspects. It may give actions as static definitions that are invoked dynamically to produce discrete transitions of the system state. In this case, the specification is often called a model program. Or, the specification may define possible transitions dynamically. In this case, the specification may be called a labeled transition system, a finite-state machine ("FSM") or a method sequence chart.

One important distinction in software testing is between glass-box and black-box testing. In typical glass-box testing, a test developer or automated testing software module has access to the source code for a particular module, library, or application being tested and can insert code into the implementation in order to affect execution of the implementation or receive information during execution. In this way, the code can be tested at whatever level of specificity the test developer desires. By contrast, in typical black-box testing, a tester or testing software application can only manipulate a particular system implementation through the interfaces the system presents to a user or to other pieces of software. This provides an experience closer to that of a customer, and allows the tester to focus on the ways the implementation will perform once it becomes a product.

Conformance testing is a common method of black-box testing based on an executable behavioral specification and some correctness criteria. This kind of testing checks that an implementation of a software system conforms to its system specification by executing the implementation in a test environment that is aware of the states and transitions envisioned by the specification (which predicts the correct behavior of the system). Conformance testing of this type is often known as "model-based testing." Model-based testing may utilize FSMs.

FSMs may be created, for example, from abstract models of software systems, including the above-mentioned model programs, or even diagrams. Methods also exist for constructing FSMs from abstract state models ("ASMs") of a tested software system. "Generating a Test Suite from an Abstract State Machine," U.S. Patent Application Publication No. 2003/0159087, published Aug. 21, 2003, describes (among other things) how to generate a finite sequential behavior encoded in a FSM from a potentially infinite model, given as an ASM.

Although the techniques described in the referenced patent publication work well for many applications, for some software systems, there is a complication. Modem software systems often utilize a design pattern where, from a main thread of control working on a problem, asynchronous threads are spawned which work on sub-problems concurrently to the main thread. At certain execution points, these concurrent threads generate asynchronous callbacks, which notify the main thread of progress or completion of the sub-problem. Testing of this kind of behavior is challenging because the callbacks from the asynchronous activity can happen at arbitrary points of time. Additionally, if several callbacks are expected, those callbacks can happen in an undetermined order, because of the non-determinism of thread execution. Modeling this complex type of behavior can be difficult.

What is needed are tools and techniques that facilitate the creation of FSMs for systems with asynchronous callback behavior.

SUMMARY

In summary, various tools and techniques described herein facilitate testing of software systems that have asynchronous callback behavior. For example, described tools and techniques produce finite state machines ("FSMs") that model asynchronous callbacks in software systems, which helps later test this important kind of behavior and thereby improve the performance and reliability of software systems. The described tools and techniques include, but are not limited to, the following.

A tool generates a finite state machine representing a software system that includes asynchronous callbacks so that the finite state machine models the asynchronous callbacks.

Or, a tool constructs a finite state machine describing a program which includes asynchronous callbacks. The tool constructs the FSM to be used to test an implementation of the program as follows. The tool receives a model of the program, wherein the model comprises plural states and plural method invocations. The tool identifies which of the plural method invocations in the program are asynchronous callbacks. For each of one or more of the plural states in the model which has at least one of the asynchronous callbacks, the tool creates an associated node of a first node type with one or more transitions of a first transition type in the finite state machine. This node is created such that at least one of the one or more transitions of the first transition type is possible when the program is in the state associated with the node of the first node type. Also, for each of one or more of the plural states in the model which has no asynchronous callbacks, the tool creates an associated node of a second node type with one or more transitions of a second transition type in the finite state machine. This node is created such that every one of the one or more transitions of the second transition type is possible when the program is in the state associated with the node of the second node type.

Or, a tool generates a finite state machine from an abstract state machine which comprises plural states, one or more controlled invocations, and one or more observable invocations and which represents a program with asynchronous callbacks. The tool generates the finite state machine as follows. The tool generates control finite state machine nodes which correspond to whichever states in the abstract state machine the one or more controlled invocations are found from. The tool generates observation finite state machine nodes which correspond to whichever states in the abstract state machine the one or more observable invocations are found from.

The various techniques and tools can be used in combination or independently.

Additional features and advantages of the invention will be made apparent from the following detailed description of embodiments that proceeds with reference to the accompanying drawings.

DETAILED DESCRIPTION

Figure 1A:
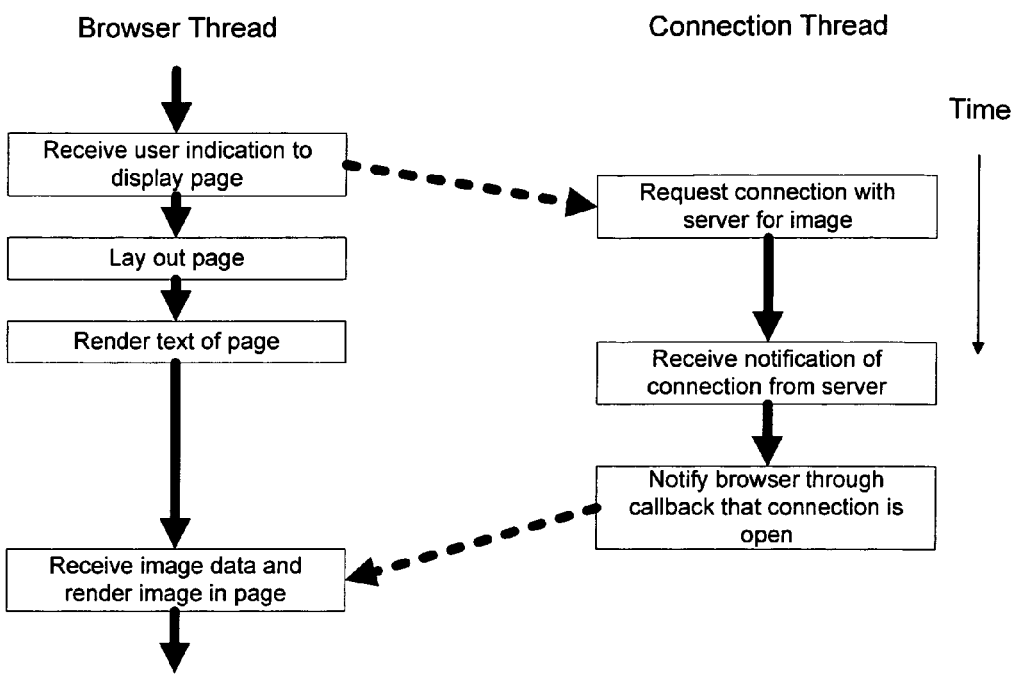
FIGS. 1a and 1b illustrate two executions of a system with asynchronous callbacks.

The following description is directed to techniques and systems for facilitating generation of FSMs. For example, an FSM generator identifies and partitions method invocations in an ASM for a software system into controlled methods and observable methods, with the last ones representing asynchronous activity. An FSM is then generated, based on states of the ASM and this partitioning.

In some embodiments, an FSM comprises a set of nodes along with a set of outgoing arcs to other nodes. For example, each node represents a state of the program being modeled and each arc represents a transition to another node (and thus a change in the system to another state). This application will refer also to methods of a software system under test, as well as method invocations which result in transitions between states. Because of this, arcs and transitions are frequently notated with the names of method invocations. This usage is made for the sake of simplicity, however, and should not be taken as a particular limitation. The techniques and tools described herein will also be recognized as applicable to other software systems, including those making function or library calls, as well as other calls or invocations in procedural, object-oriented, and functional language systems. Similarly, while an ASM may also be described with reference to its nodes, or an FSM described with reference to its states, for the sake of clarity and consistency, references made herein will be to the states of an ASM, and to the nodes of an FSM.

In some embodiments, controlled method invocations are for those methods which can be called from a test harness, and observed method invocations are for those methods which cannot be called by a test harness but instead can only be observed as they are called asynchronously and spontaneously by the system under test. Alternatively, identification of controlled and observable methods does not take place with respect to a test harness, but is defined with respect to which methods are invoked in one thread asynchronously by another thread (the observable invocations), and which are invoked synchronously within a thread (the controlled invocations).

Considering the point of view of an implementation of a system modeled with observed methods and controlled methods, in some embodiments, in any given model state and its corresponding implementation state, the implementation must be able to perform all the controlled methods that the model predicts. In turn, the implementation is only required to do one of the observed methods the model predicts. This conformance notion is encoded in an FSM generated with two different kinds of nodes, control nodes and observation nodes. Control nodes represent branching with controlled methods, where every transition going out of a control node must be possible when an implementation is at the state associated with the node. Observation nodes, by contrast, represent branching with observed methods, where an implementation is only required to take one of the transitions going out of an observation node. Alternatively, different rules for node conformance apply.

In some embodiments, where a given state of an ASM has enabled both controlled and observable methods, the FSM is constructed so as to give time to an implementation (which is being tested against it) so that the implementation may come up with the observed activity. The FSM is constructed so as to proceed with controlled method activity after that time elapses. To allow for this time, when the FSM is constructed a special timeout transition (which is like an observed method activity) is introduced between an observation node to a control node.

In general, the FSM generation system may be a single software module or multiple software modules, and the various tasks of the conformance testing system may be performed concurrently or at separate times. Alternatively, one or more tasks of the FSM generation system are performed by another system or systems.

Methods of utilizing FSMs in particular in model-based testing are described further, for example, in "Non-Deterministic Testing," U.S. patent application Ser. No. 10/758,797, filed Jan. 15, 2004, which is herein incorporated by reference. Alternatively, the generated FSMs are used in other model-based testing, another type of testing, or for some other purpose.

1. Example of Asynchronous Callbacks

Figure 1B:
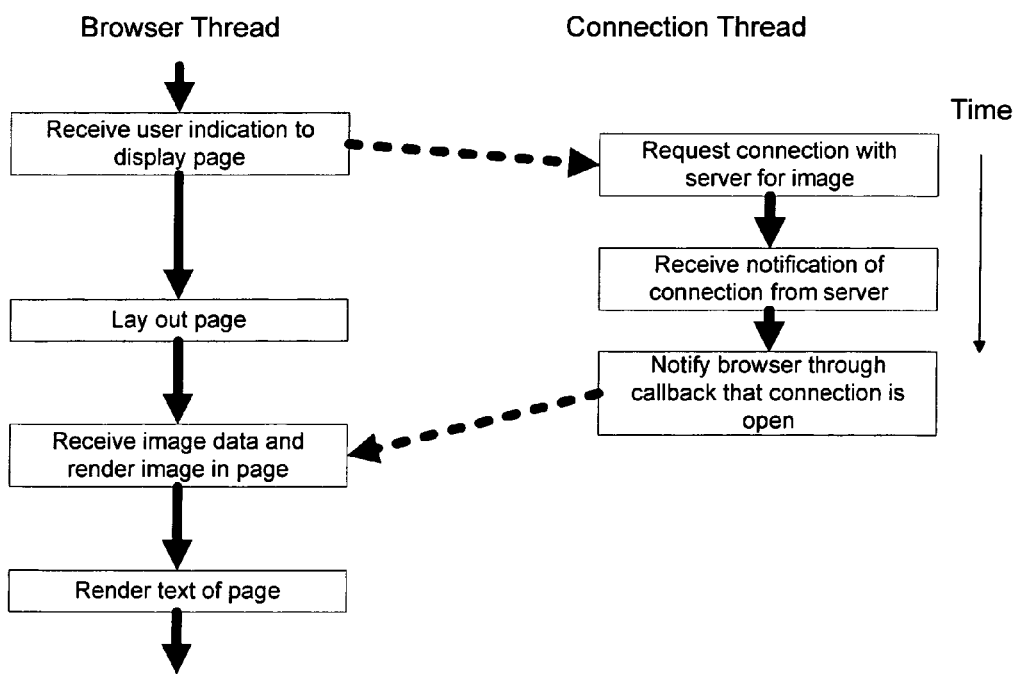

FIGS. 1a and 1b illustrate one example of a system with asynchronous behavior—a Web browser software system with asynchronous callbacks. In the illustrated system, a user enters a URL for a Web page containing an image, and a separate connection thread is spawned to attempt to open a connection to the server containing the image file and request the image file. (Separate connection threads for the layout information and text information for the Web page are not shown.) This connection attempt does not block the Web browser application, since the connection attempt is executed asynchronously with the main thread of control (here, the user interface and rendering thread of the browser). Once the lookup finishes, successfully or unsuccessfully, the main thread is notified and changes its status accordingly. FIGS. 1*a* and 1 *b* illustrate two possible executions of the system in which the browser receives a user indication to display a page, spawns a connection thread for the image, lays out the page, and renders the text of the page. The connection thread in the example, upon being spawned, requests a connection with the image server, receives notification of the connection, and then notifies the browser via a callback that the connection is available. Upon receiving the callback indication the browser immediately retrieves the image data and renders the image in the Web page.

FIGS. 1*a* and 1*b* illustrate that, while both executions result in the same behavior, there is no clear guarantee of when the callback will occur. Additionally, the figures illustrate that the time when the callback occurs can result in different execution orders. FIG. 1 *a* illustrates an execution where the connection thread takes a relatively long time to create a connection with a server and make a callback to the browser, so that the text of the web page is rendered before the image is downloaded and rendered. FIG. 1*b* illustrates an execution where the connection is made more quickly, and the callback to the browser thread, and thus the rendering of the image, happens before the text is rendered. As the executions show, an FSM which correctly models the behavior of a software system with asynchronous callbacks should handle callbacks which happen at different times and which cause different orders of execution.

2. Examples of the Finite State Machine Generator

Figure 2:
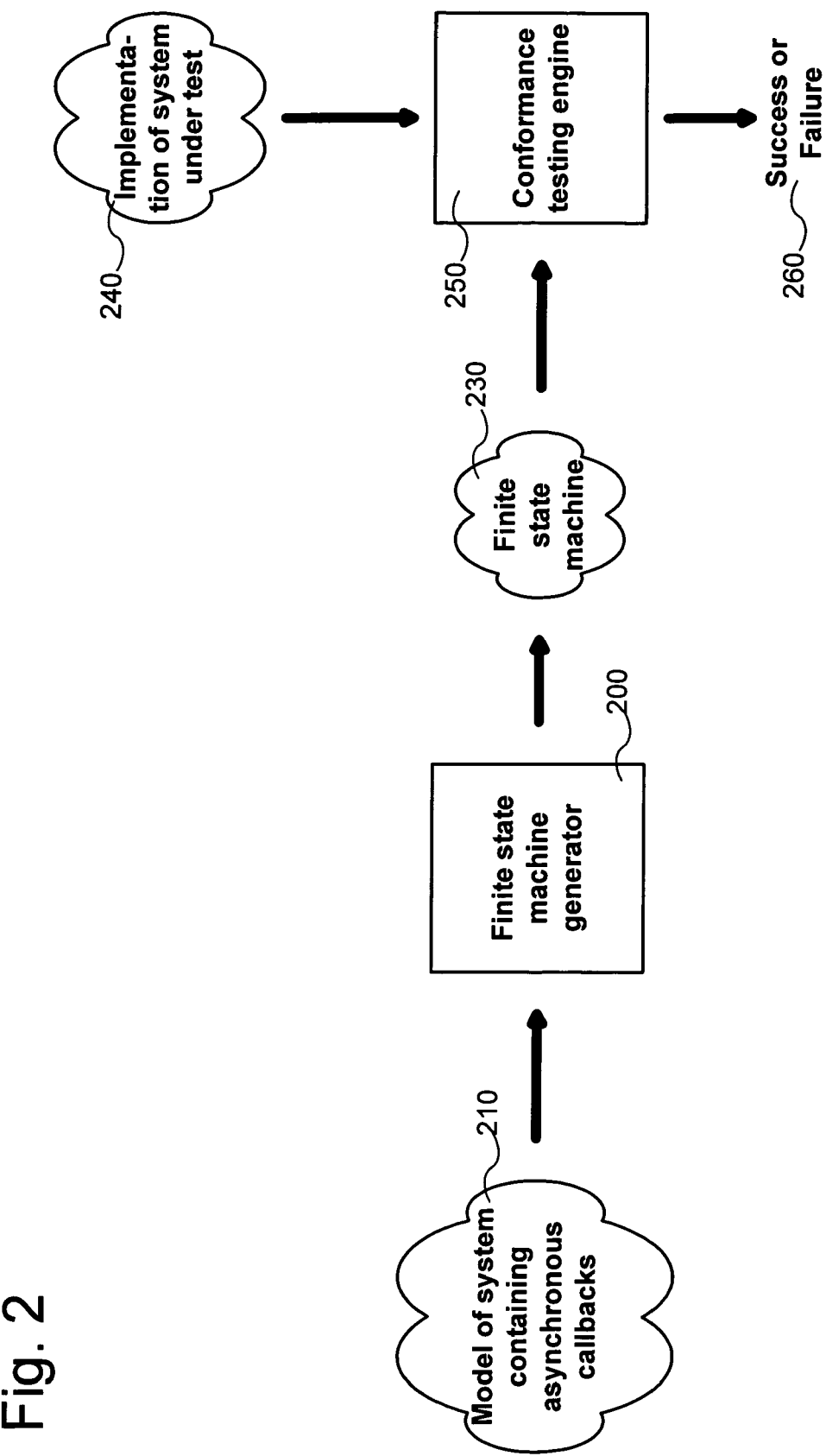
FIG. 2 is a block diagram of a finite state machine generator used to perform software testing in a computer system.

FIG. 2 illustrates a generalized diagram of a FSM generator 200 in a computer system. In various implementations, modules illustrated in FIG. 2 may be combined, subdivided, or omitted altogether. FIG. 2 illustrates the interactions between the model of the system being tested 210, the FSM generator 200, and a conformance testing engine 250.

In FIG. 2, the FSM generator 200 works in conjunction with a model 210 of the system being tested, which contains asynchronous callbacks, to create a FSM 230. In some embodiments, this model 210 is a fully-formed ASM; in others it may be another type of model, as described above. In yet other embodiments, the model may be generated directly from source code for the software system by the FSM generator 200.

After creation, the FSM 230 is passed to the conformance testing engine 250. The conformance testing engine 250 then is able to utilize the FSM 230 to test an implementation 240 of the system under test and to produce an indication 260 of whether the test was successful or a failure. In some embodiments, the FSM generator 200 is combined with the conformance testing engine 250 to directly test the model 210 against the implementation 240. Alternatively, they are separate software modules or applications and/or testing occurs later.

3. Examples of an FSM Created for Code Utilizing Asynchronous Callbacks

Figure 3:
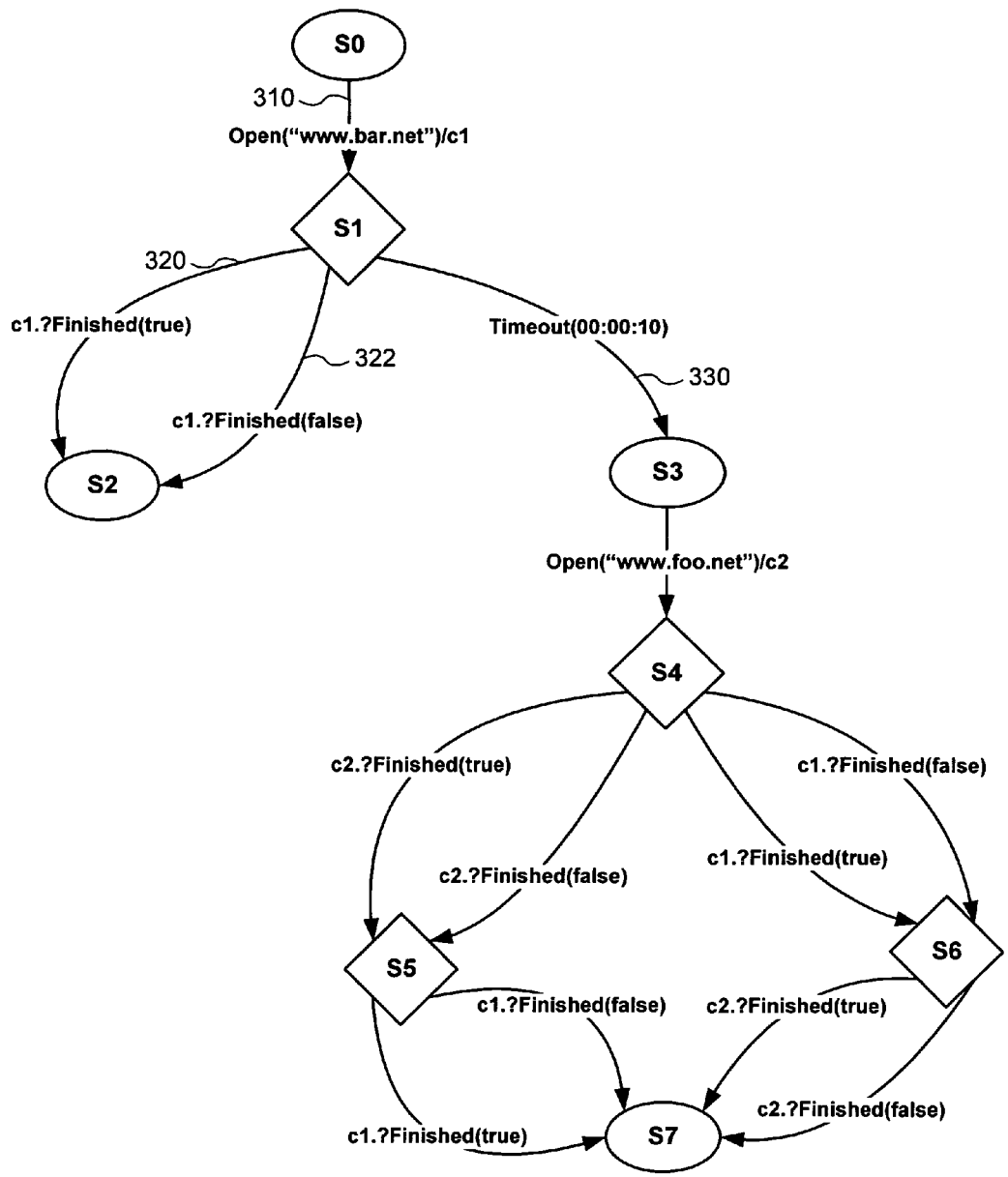
FIG. 3 illustrates one example of a FSM which is generated for a system with asynchronous callbacks.

FIG. 3 illustrates an example of an FSM modeling URL opening functionality on an abstract level. While the FSM is created from a code model given in the Spec# modeling language, other modeling languages which provide state-based modeling of software APIs, or even plain programming languages, can be used. Moreover, although the example in FIG. 3 is small in order to illustrate the conceptual issues, the approach scales to larger systems.

The code model given below contains attributes which describe whether methods are controlled or observable. Alternatively, methods are annotated or evaluated using another mechanism.

```
class Connection {
    readonly string URL;
    bool opening;
    [Action(Kind=ActionAttributeKind.Controlled)]
    static Connection Open(string URL)
    {
        return new Connection(URL,true);
    }
    [Action(Kind=ActionAttributeKind.Observable)]
    void Finished(bool successful)
        requires opening;
    {
        opening = false;
    }
    static System.TimeSpan WaitUntilOpenAgain =
            System.TimeSpan.FromSeconds(10);
}
```

The software fragment consists of a method ("open") which is called to open a URL, resulting in an object (of class "Connection") representing the connection attempt for that URL. Opening a URL is a controlled method. On a connection object, there also exists an observed method which is called spontaneously when the connection attempt either succeeds or has been aborted.

The class connection represents (a fragment of) a URL connection. The state of the class (and the model) is (a) the URL being opened and (b) a Boolean variable indicating whether opening is currently in progress. The class has a static method open for opening a connection, which delivers a new connection object. The attribute on the open method indicates that this is a controlled method. When called, the method creates a connection object with the given URL and the opening flag is set to true.

The class also has an instance method Finished which is spontaneously called to indicate that opening of the URL has been finished (either successfully or unsuccessfully). The attribute on the Finished method indicates that this is an observed method. This method also has a pre-condition which states that the Finished method is applicable only on a connection which is currently in the opening state (i.e., opening =true). The effect of the Finished method in the model is just to reset the opening state to false. The code also shows a static helper field, waituntilopenAgain, which indicates the amount of time to wait for the Finished callback before attempting to open more connections.

Note that the FSM illustrated in FIG. 3 represents the exploration of the state space of the model given above where certain filtering techniques are applied to prune the potential infinite state space. These filtering techniques are beyond the scope of this patent application, but are described in further detail in the patent application entitled, "Generating a Test Suite from an Abstract State Machine." In some embodiments, the generation of the FSM requires some instrumentation of the model which are have omitted here. For example, in some embodiments the FSM generator tool needs to be told what value to take for a timeout when both controllable and observable methods are enabled (this is the value of waituntilopenAgain), and which filtering techniques should be used.

FIG. 3 illustrates an FSM for a test scenario in which two connections are opened. First the open method is called to create a connection (in control node SO). This is illustrated in FIG. 3 by the controlled transition 310. This leads to the observation node S1 where the Finished callback can be observed in one of the two transitions 320 or 322 leading to control node S2. However, because this is an asynchronous callback, it cannot be relied upon that this callback will happen before the controlled open method is called for the second connection. Thus, at the state corresponding to node S1 in the ASM from which this FSM is constructed, the controlled open method is also enabled. Because node S1 is an observation node, though, this method is removed and placed in a control node. Note that while the controlled open method is also enabled at control node S2, transitions created by this method are omitted in FIG. 3 for the sake of simplicity of the example. The FSM generator 200 creates an observed Timeout transition 330, which leads to control node S3 where a further connection is created. This gives an implementation time to allow the observed Finished callback to take place for the first connection ("c1"), while still providing an observable method (the Timeout transition) which is definitely enabled at the node. The timeout transition 330 leads to observation node S4, where there is now a choice between observing the Finished callback on one of the two open connections. Depending on which connection replies first, the FSM continues in S6 or S5 to wait for the non-finished connection. Note that under different executions in the test scenario, all opening attempts are eventually finished, but there is no fixed order in which this is done.

4. Examples of FSM Generation Processes

Figure 4:
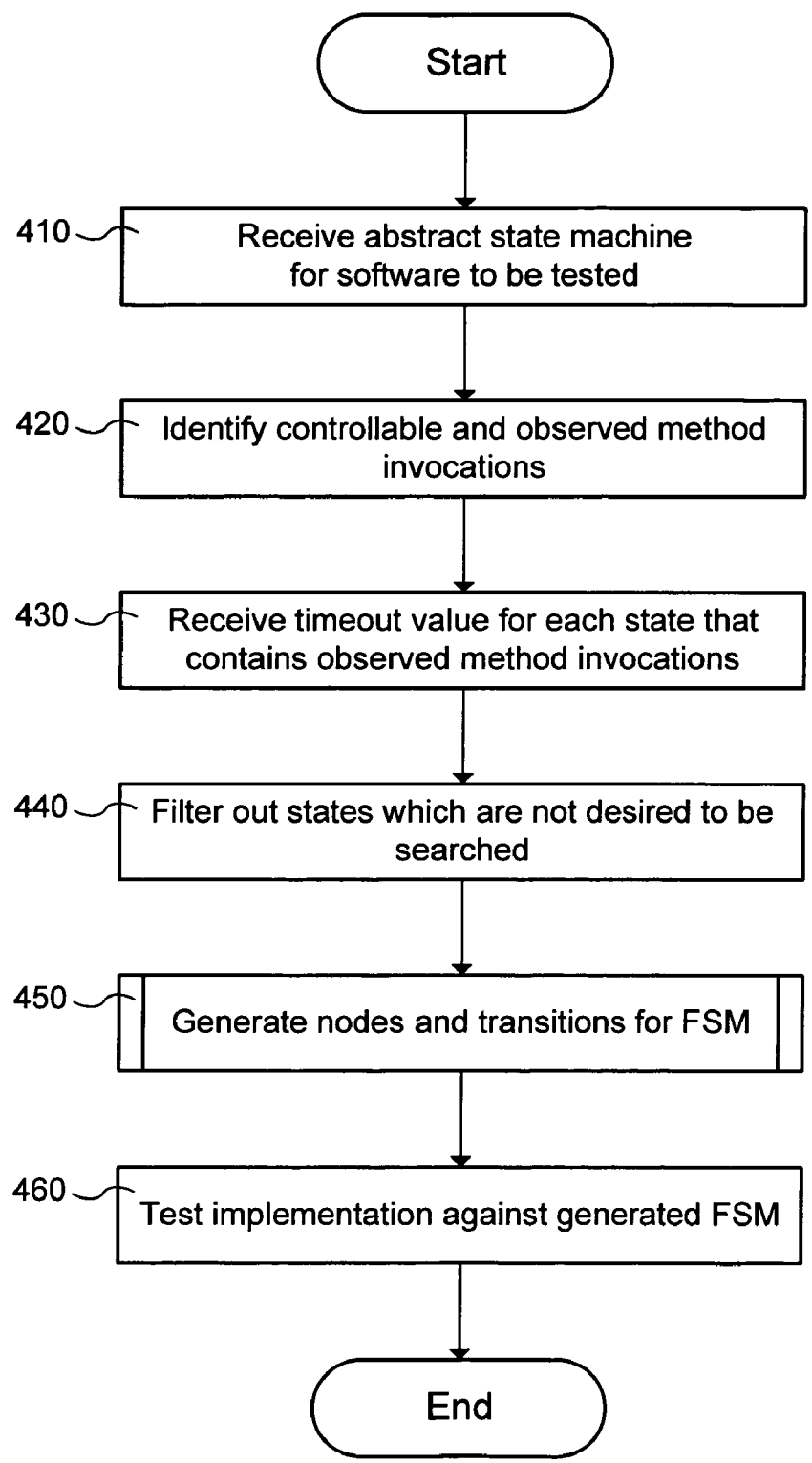
FIG. 4 is a flowchart for a process performed by the systems of FIG. 2 for generating and using an FSM for a system with asynchronous callbacks.

FIG. 4 is a flowchart illustrating one example of a process for generating an FSM for a system with asynchronous callbacks and using the FSM for software testing. In various embodiments, blocks illustrated in FIG. 4 may be combined, broken into sub-blocks, or omitted and the ordering of blocks may be modified. A tool including modules such as the FSM generator 200 and conformance testing engine 250 of FIG. 2 performs the process. Alternatively, another tool performs the process.

The process begins at block 410, where the tool receives an ASM for the software being tested. As discussed above, alternatively, other types of models, or even programming code itself my be received in lieu of an ASM. Also, in some embodiments, the received ASM may be instrumented to facilitate later timeout and filtering procedures. Or, the ASM is not specially instrumented, and filtering and timeout needs are dealt with separately.

The process then continues to block 420, where the tool identifies controllable and observed method invocations. For example, this is done by observing annotation or instrumentation in the ASM which describes the method invocations the ASM contains. Or, the ASM is analyzed to make these determinations. In still other cases, user input is requested to identify which type a given invocation is.

Next at block 430, the tool receives a timeout value for each state in the ASM which contains observable methods. For example, this is done by instrumenting the ASM with timeout values. Or, this is done by requesting values from a user or through some other mechanism.

The process continues to block 440, where the tool filters states when it is desired that they not be searched. FIG. 4 shows an abstract filtering mechanism. In some embodiments, this mechanism is described as a predicate over the model states. Filters prune the potentially infinite state space of an ASM to a representative, finite one. Filters may be defined in various ways in different embodiments; some are described in the patent application publication entitled, "Generating a Test Suite from an Abstract State Machine," referenced above. In the context of FIG. 4, to ensure soundness only controlled transitions are filtered. A controlled transition can be safely dropped if a tester decides not to test it; the resulting test will still be sound, even if the test is incomplete. In contrast, in the context of FIG. 4, observed transitions are not dropped because a tester cannot control them during testing, so those transitions are preserved in the generated FSM.

Mathematically, sufficient conditions for termination of the process shown in FIG. 4, and thus generation of a finite state machine, are (a) that the subset of model states which satisfy the predicate filter(s) is finite and (b) that there are no infinite sequences of observable transitions (i.e., each sequence of observable transitions eventually leads to a state where only controlled transitions are enabled). In some embodiments, filtered states are identified by instrumentation of the ASM; in others, user input or a prescribed filtering mechanism is used. Additionally, in some embodiments filtering is performed prior to the construction of the FSM, while in others, filtering and FSM generation happen concurrently.

Next, at block, 450, the tool generates nodes and transitions for the FSM. Example processes for this generation are described in greater detail below with reference to FIG. 5. Alternatively, the tool uses another mechanism to generate nodes and transitions for the FSM.

Finally, the process continues to block 460, where the tool tests one or more implementations of the system against the newly-generated FSM, and then the process ends. For example, the tool uses a testing method described in U.S. patent application Ser. No. 10/758,797.

5. Formal Characterization of the Model

According to one possible formal example of a model, a state of the model is an assignment of model variables to values, although the exact relation is abstract and implementation dependent. A method invocation describes a call of a method with given parameter values and return value, written as $i=m(v_1, \ldots, v_n)/v$. Given I, the set of invocations, two distinct subsets of I are recognized: controlled invocations C and observed invocations O, such that $I = C + O$. An invocation is said to be enabled in a given model state if it's pre-condition is true. A transition (s, i, s') moves the model from one state s to another state s' by an invocation i that is enabled in s. Alternatively, the model is otherwise parameterized.

6. Further Examples of FSM Generation Processes

Figure 5:
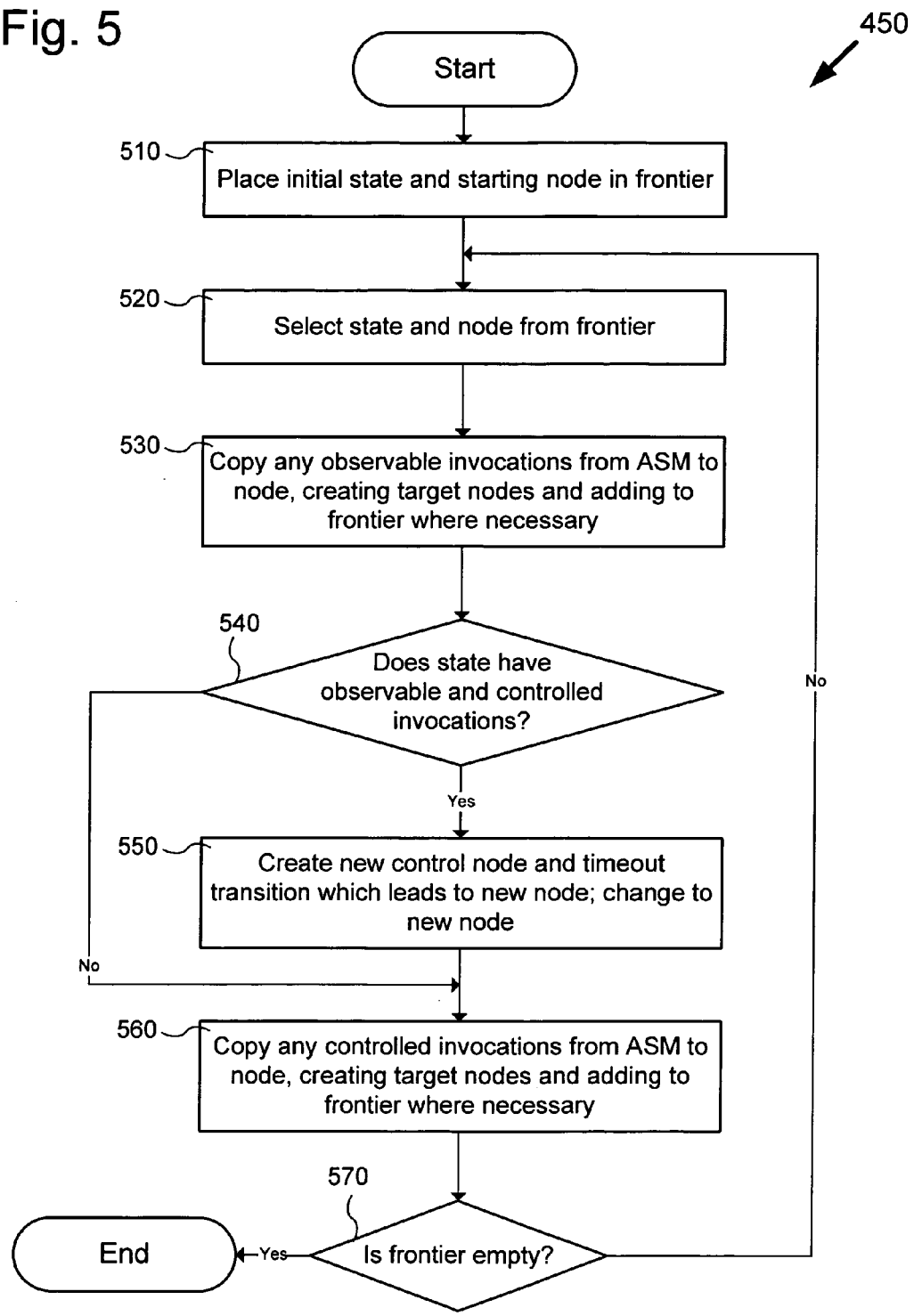
FIG. 5 is a flowchart for a sub-process performed by the systems of FIG. 2 for generating an FSM for a system with asynchronous callbacks.

FIG. 5 is a flowchart illustrating one example of a process for generating an FSM from an ASM with controlled and observable method invocations. In various embodiments, blocks illustrated in FIG. 5 may be combined, broken into sub-blocks, or omitted and the ordering of blocks may be modified. A tool including a module such as the FSM generator 200 of FIG. 2 performs the process. Alternatively, another tool performs the process.

In FIG. 5, the process works on a "frontier" of pairs of ASM states and FSM nodes, and processes the frontier until it is empty. It additionally uses a mapping between states of the ASM and nodes of the FSM, which allows it to keep track of which states in the ASM have had associated nodes created in the FSM.

The process begins at block 510, where the tool places the initial state of the ASM and a newly-created starting node of the FSM in the frontier. Because the FSM is being newly-generated, the starting node is often the first node of the FSM created.

Next, at block 520, the tool selects a pair consisting of a state and node from the frontier. While the first time the process of block 520 is performed, the only pair available in the frontier is the initial ASM state and FSM starting node, as the process continues additional pairs will be added to the frontier, allowing further selection to take place. In some embodiments, the choice from the frontier is deterministic, while in others it is nondeterministic.

Next, at block 530, the tool copies transitions based on observable invocations from the selected state of the ASM to the FSM node as observable transitions. Because these invocations were identified in block 420 of FIG. 4, this can involve reviewing the type for each invocation on the chosen state. Additionally, at block 530, if an invocation being copied leads to a state for which there is currently no associated node in the FSM, the tool creates such a node, and the tools adds the node and target state of the invocation to the frontier for later exploration.

At this point in the process, transitions based on observable method invocations in the ASM for the currently selected state have been copied. However, a state in the ASM may enable both controlled and observable method invocations. Hence, at decision block 540, the tool determines if there are method invocations of both types enabled by the state. If so, at block 550 the tool creates a new control node to help segregate these controlled transitions from the observable transitions, and the tool adds a timeout transition which leads from the node containing the observable transitions to the new node. Additionally, at block 550, the selected node of the FSM which is being explored is changed to the new node, so that any work done with controlled transitions can take place on the new node.

Next, at block 560, the tool copies transitions based on controlled invocations from the selected state of the ASM to the FSM node as controlled transitions. The FSM node operated on at block 560 may be the node selected at block 520, or it may be the new node created at block 550, depending on whether or not observable method invocations existed for the node selected at block 520.

Next, at decision block 570, the tool inspects the frontier to see if it is empty, or if newly-created pairs of states and nodes exist in it. If there are pairs left, the process continues back to block 520. If not, the process ends.

7. Exemplary FSM Generation Implementation

One detailed implementation of an algorithm to construct an FSM from an ASM is described herein using the modeling language AsmL. A definition for the language is found in Microsoft Research Technical Report MSR-TR-2004-27. The algorithm and AsmL code presented herein are merely for purposes of example and should not be taken to exclude other implementations or methods of coding the techniques described above.

The input to the algorithm in this section comprises in part a model, $M=(S, s_0, I, R)$, where S is the set of states, so is an initial state, $I=C+O$ is a set of invocations partitioned into controlled and observed invocations, and R is a transition relation, with $(s,i,s')$ as the elements of R. Input also comprises a timeout predicate timeout(s) (which assigns to each state s a time duration) and a filter predicate on states of the ASM, filter(s) (which filters out undesired states, as described above). The output of the algorithm in this section is an FSM. In this implementation, the FSM consists of a set of nodes n. Each node has a kind, n.kind, which can be one of ObservationNode or ControlNode. Additionally, each node has a set of outgoing arcs, n.arcs, which is a set of pairs $(l,n)$, where n is a target node and l is a label, which can be either a method invocation or a timeout value. This implementation, and the accompanying description, continue to use the term "nodes" for the FSM and "states" for the ASM in order to avoid confusion.

As described above, the algorithm in this section works on a frontier of pairs of model states and FSM nodes, and processes this frontier until the frontier is empty. It also uses a mapping from model states to FSM nodes, called discovered states, which records those states of the ASM which have been already visited during FSM construction, and their associated FSM node.

```
let initialFSMNode = new Node
var frontier initially {(s0,initialFSMNode)}
var discoveredStates as Map of State to Node
                 initially {s0 -> initialFSMNode}
while frontier < > { } do
   step
      // (1) select some arbitrary state-node pair from frontier
      let (s,n) = select(frontier)
      remove (s,n) from frontier
   step
      // (2) get observed and controlled transitions starting from s
      let observed = {(s,i,s') in R where i in O}
      let controlled = {(s,i,s') in R where i in C and filter(s')}
   step
      // (3) add observed transitions
      if observed < > { }
         n.kind := ObservationNode
         foreach (_,i,s') in observed
            AddArc(n,i,s')
   step
      // (4) add timeout transition
      if controlled < > { } and observed < > { }
         let n' = new Node
         add (timeout(s),n') to n.arcs
         n := n'
   step
      // (5) add controlled transitions
      if controlled < > { }
         n.kind := ControlNode
         foreach (_,i,s') in controlled
            AddArc(n,i,s')
   AddArc(n,i,s')
      if s' in discoveredStates
         add (i,discoveredStates[s']) to n.arcs
      else
         let n' = new Node
         add (i,n') to n.arcs
         add (s',n') to frontier
         discoveredStates[s'] = n'
```

In each iteration of the algorithm in this section, one pair of a model state and FSM node are selected from the frontier in section (1), and the process calculates those transitions enabled in the model state which are controlled and which are observed at (2). In the algorithm, the controlled transitions are restricted to those ones which end in a state that satisfies the filter predicate.

If there are any observed transitions, the process marks the source node in the FSM as an observation node. For each invocation and target state in the model, the algorithm then creates an arc in the FSM by calling the auxiliary method AddArc, which is described in section (3). This auxiliary method checks whether the target model state s' has been visited before. If so, it draws a loop arc to the node associated with this state. If not, it creates a new FSM node, draws an arc to that node, and adds the pair (s',n') to the frontier for further exploration. It also remembers the mapping s' to n' in the discoveredstates map.

If both controlled and observed transitions are enabled, the process adds a timeout arc from the source node n to some new created node n'. At (4), the source node n is then updated to n', so that any controlled transitions which are copied from the ASM may continue from that node. Finally, if there are any controlled transitions, arcs for those starting from the node n are added at (5). As mentioned above, at (5), n may be either the original source node or the node n' which has been created in the previous step.

8. Computing Environment

The above described techniques and systems (including the FSM generator 200) can be implemented on any of a variety of computing devices and environments, including computers of various form factors (personal, workstation, server, handheld, laptop, tablet, or other mobile), distributed computing networks, and Web services, as a few general examples. The systems can be implemented in hardware circuitry, as well as in software 680 executing within a computer or other computing environment, such as shown in FIG. 6.

Figure 6:
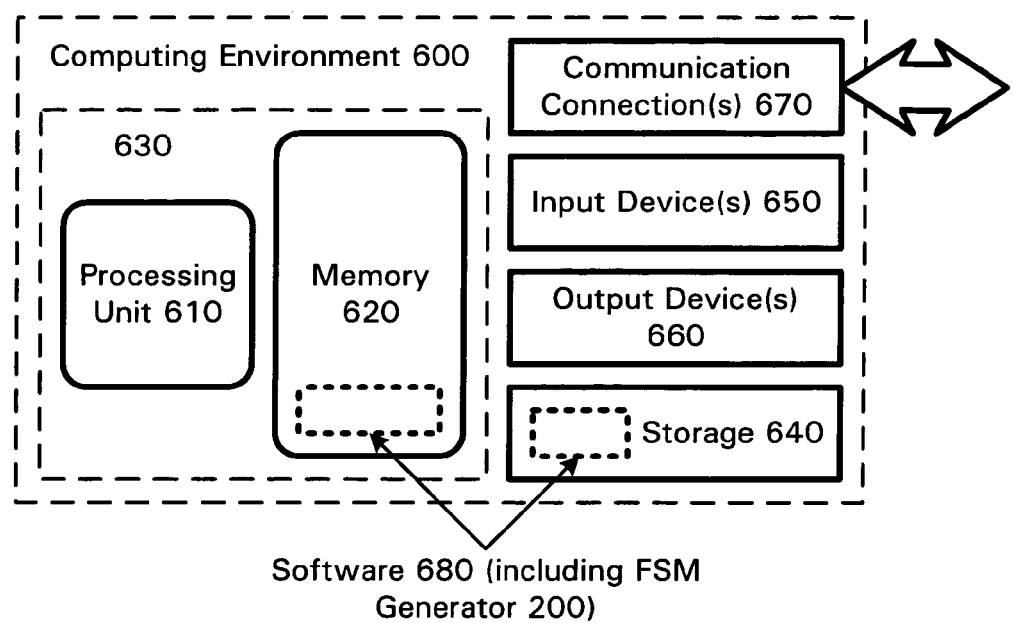
FIG. 6 is a block diagram of a suitable computing environment for implementing the systems of FIG. 2.

FIG. 6 illustrates a generalized example of a suitable computing environment 600 in which the described techniques can be implemented. The computing environment 600 is not intended to suggest any limitation as to scope of use or functionality of the invention, as the present invention may be implemented in diverse general-purpose or special-purpose computing environments.

With reference to FIG. 6, the computing environment 600 includes at least one processing unit 610 and memory 620. In FIG. 6, this most basic configuration 630 is included within a dashed line. The processing unit 610 executes computer-executable instructions and may be a real or a virtual processor. In a multi-processing system, multiple processing units execute computer-executable instructions to increase processing power. The memory 620 may be volatile memory (e.g., registers, cache, RAM), non-volatile memory (e.g., ROM, EEPROM, flash memory, etc.), or some combination of the two. The memory 620 stores software 680 implementing, for example, the FSM generator 200.

A computing environment may have additional features. For example, the computing enviromnent 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other medium which can be used to store information and which can be accessed within the computing environment 600. The storage 640 stores instructions for the software 680.

The input device(s) 650 (e.g., for devices operating as a control point in the FSM generator 200) may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The FSM generation techniques and tools presented herein can be described in the general context of computer-readable media. Computer-readable media are any available media that can be accessed within a computing environment. By way of example, and not limitation, with the computing environment 600, computer-readable media include memory 620, storage 640, communication media, and combinations of any of the above.

The techniques and tools presented herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

In view of the many possible embodiments to which the principles of our invention may be applied, we claim as our invention all such embodiments as may come within the scope and spirit of the following claims and equivalents thereto.

We claim:

1. In an analysis tool, a method comprising generating, from an abstract state machine which models a software system, a finite state machine representing the software system, the software system including asynchronous callbacks, wherein the finite state machine models the asynchronous callbacks.

2. The method of claim 1, further comprising testing an implementation of the software system against the generated finite state machine.

3. The method of claim 2, wherein:
   the testing comprises using a test harness to test the implementation;
   the finite state machine comprises plural nodes and plural transitions; and
   the plural transitions comprise one or more controlled transitions and one or more observed transitions.

4. The method of claim 3, wherein the one or more controlled transitions in the finite state machine represent one or more methods in the implementation which can be controlled by the test harness; and
   wherein the one or more observed transitions in the finite state machine represent one or more methods in the implementation which cannot be controlled by the test harness.

5. The method of claim 1, wherein:
   the abstract state machine which models the software system comprises plural states and plural invocations, the plural invocations comprising one or more controlled invocations and one or more observed invocations;
   the generating the finite state machine comprises generating plural nodes and plural transitions which are based on the plural states and the plural invocations found in the abstract state machine; and the plural nodes include one or more control nodes and one or more observation nodes.

6. The method of claim 5, wherein each of the plural nodes represents a corresponding state of the plural states, wherein each of the plural transitions represents a corresponding invocation of the plural invocations, and wherein the generated finite state machine is configured such that the corresponding invocation for each transition leaving one of the one or more control nodes must be possible in the corresponding state represented by the control node.

7. The method of claim 5, wherein each of the plural nodes represents a corresponding state of the plural states, wherein each of the plural transitions represents a corresponding invocation of the plural invocations, and wherein the generated finite state machine is configured such that the corresponding invocation for at least one transition leaving one of the one or more observation nodes must be possible in the corresponding state represented by the observation node.

8. The method of claim 5, further comprising, when encountering one of the plural states of the abstract state machine which enables both one of the one or more controlled invocations and one of the one or more observed invocations, generating one of the plural control nodes and one of the plural observation nodes in the finite state machine.

9. The method of claim 8, further comprising generating a transition, starting at the generated observation node and ending at the generated control node, which represents a time out.

10. The method of claim 5, further comprising applying a filtering process to one or more of the plural states of the abstract state machine.

11. A method of constructing a finite state machine describing a program which includes asynchronous callbacks, the finite state machine constructed to be used to test an implementation of the program, and the method comprising:
receiving a model of the program, the model comprising plural states and plural method invocations;
identifying which of the plural method invocations in the program are asynchronous callbacks;
for each of one or more of the plural states in the model which has at least one of the asynchronous callbacks, creating an associated node of a first node type with one or more transitions of a first transition type in the finite state machine such that at least one of the one or more transitions of the first transition type is possible when the program is in the state associated with the node of the first node type;
for each of one or more of the plural states in the model which has none of the asynchronous callbacks, creating an associated node of a second node type with one or more transitions of a second transition type in the finite state machine such that every one of the one or more transitions of the second transition type is possible when the program is in the state associated with the node of the second node type; and
for each of one or more other states of the plural states in the model:
creating a first associated node of the first node type and a second associated node of the second node type in the finite state machine; and
generating a timeout transition from the first associated node to the second associated node.

12. The method of claim 11, further comprising ignoring one or more of the plural states in the model which fail a filtering process.

13. The method of claim 11, further comprising testing the implementation of the program against the finite state machine.

14. One or more storage media containing instructions which, when executed by a computer, cause the computer to perform a method of generating a finite state machine from an abstract state machine, the abstract state machine comprising plural states, one or more controlled invocations, and one or more observable invocations and representing a program with asynchronous callbacks, and the method comprising:
generating control finite state machine nodes which correspond to those of the plural states in the abstract state machine from which the one or more controlled invocations are found; and
generating observation finite state machine nodes which correspond to those of the plural states in the abstract state machine from which the one or more observable invocations are found.

15. The storage media of claim 14, wherein the method further comprises, in response to finding one of the plural states in the abstract state machine which has both at least one observable invocation and at least one controlled invocation, generating both an observation finite state machine node and a control finite state machine node in the finite state machine and connecting both nodes with a timeout transition.

16. The storage media of claim 14, wherein:
the one more controlled invocations can be executed by a test harness; and
the one or more observable invocations are executed independently by the program and can be observed but not executed by the test harness.

17. The storage media of claim 14, wherein the method further comprises testing an implementation of the program against the generated finite state machine.

18. In an analysis tool, a method comprising:
generating a finite state machine representing a software system that includes asynchronous callbacks, wherein the finite state machine models the asynchronous callbacks, wherein the finite state machine comprises plural nodes and plural transitions, and wherein the plural transitions comprise one or more controlled transitions and one or more observed transitions; and
testing an implementation of the software system against the finite state machine, wherein the testing comprises using a test harness to test the implementation, wherein the one or more controlled transitions in the finite state machine represent one or more methods in the implementation which can be controlled by the test harness, and wherein the one or more observed transitions in the finite state machine represent one or more methods in the implementation which cannot be controlled by the test harness.

19. The method of claim 18, wherein the finite state machine is generated from a model of the software system, and wherein the model is a state transition system.

20. The method of claim 18, wherein the finite state machine is generated from a model of the software system, and wherein the model is a model program.

21. In an analysis tool, a method comprising:
generating a finite state machine representing a software system that includes asynchronous callbacks, wherein:
the finite state machine models the asynchronous callbacks;
the finite state machine is generated from a model of the software system comprising plural states and plural invocations, the plural invocations comprising one or more controlled invocations and one or more observed invocations; and the generating the finite state machine comprises generating plural nodes and plural transitions which are based on the plural states and the plural invocations found in the model of the software system, the plural nodes including one or more control nodes and one or more observation nodes, including, when encountering one of the plural states of the model which enables both one of the one or more controlled invocations and one of the one or more observed invocations, generating one of the plural control nodes and one of the plural observation nodes in the finite state machine.

22. The method of claim 21, further comprising generating a transition, starting at the generated observation node and ending at the generated control node, which represents a time out.

23. The method of claim 21, wherein the model is a state transition system.

24. The method of claim 21, wherein the model is a model program.

25. The method of claim 21, further comprising testing an implementation of the software system against the generated finite state machine.

26. In an analysis tool, a method comprising:

generating a finite state machine representing a software system that includes asynchronous callbacks, wherein:

the finite state machine models the asynchronous callbacks;

the finite state machine is generated from a model of the software system comprising plural states and plural invocations, the plural invocations comprising one or more controlled invocations and one or more observed invocations; and the generating the finite state machine comprises generating plural nodes and plural transitions which are based on the plural states and the plural invocations found in the model of the software system, the plural nodes including one or more control nodes and one or more observation nodes; and applying a filtering process to one or more of the plural states of the model.

27. The method of claim 26, wherein the model is a state transition system.

28. The method of claim 26, wherein the model is a model program.

29. The method of claim 26, further comprising testing an implementation of the software system against the generated finite state machine.

30. A method of constructing a finite state machine describing a program which includes asynchronous callbacks, the finite state machine constructed to be used to test an implementation of the program, and the method comprising:

receiving a model of the program, the model comprising plural states and plural method invocations;

identifying which of the plural method invocations in the program are asynchronous callbacks;

for each of one or more of the plural states in the model which has at least one of the asynchronous callbacks, creating an associated node of a first node type with one or more transitions of a first transition type in the finite state machine such that at least one of the one or more transitions of the first transition type is possible when the program is in the state associated with the node of the first node type;

for each of one or more of the plural states in the model which has none of the asynchronous callbacks, creating an associated node of a second node type with one or more transitions of a second transition type in the finite state machine such that every one of the one or more transitions of the second transition type is possible when the program is in the state associated with the node of the second node type; and ignoring one or more of the plural states in the model which fail a filtering process.

31. The method of claim 30, further comprising testing the implementation of the program against the finite state machine.

* * * * *